July 13, 1954      A. G. BUHR      2,683,404
PLOW ATTACHMENT FOR TRACTORS
Filed Jan. 21, 1949      4 Sheets-Sheet 2
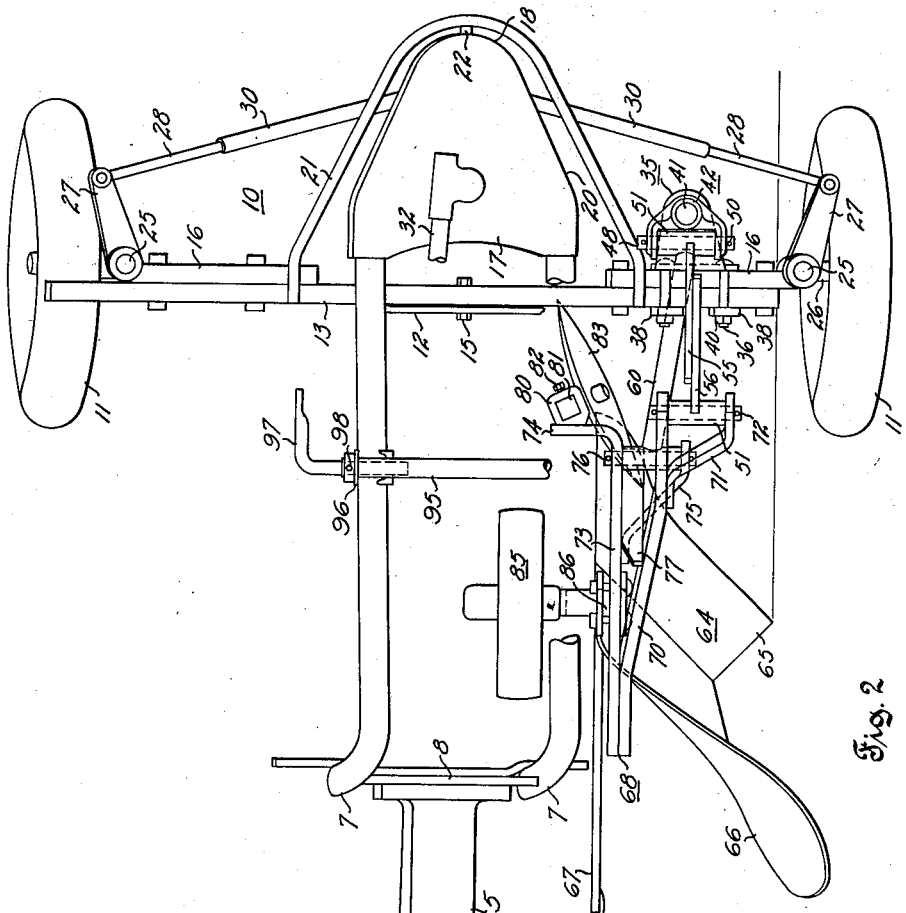
Fig. 2
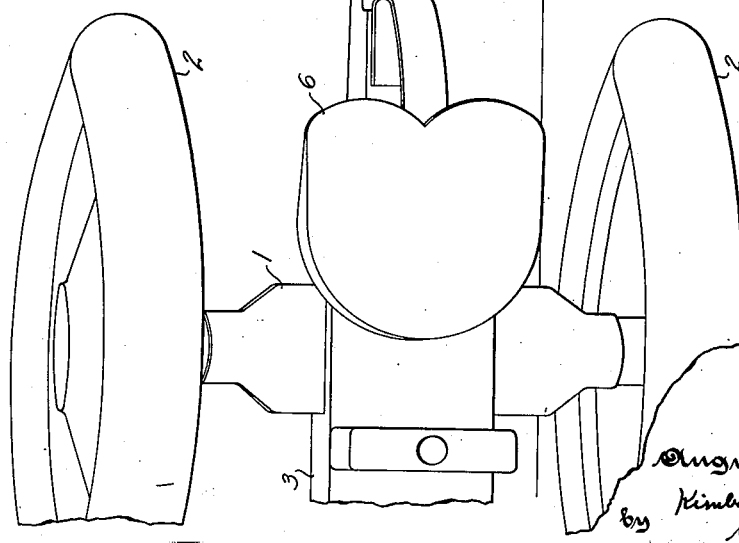
Inventor
August G. Buhr
by Kimball A. Wyman
Attorney July 13, 1954  A. G. BUHR  2,683,404
PLOW ATTACHMENT FOR TRACTORS
Filed Jan. 21, 1949  4 Sheets-Sheet 3

Inventor
August G. Buhr
by Kimball A. Wyman
Attorney

July 13, 1954

A. G. BUHR 2,683,404

PLOW ATTACHMENT FOR TRACTORS

Filed Jan. 21, 1949

Inventor
August G. Buhr
By Kimball S. Wyman
Attorney

Patented July 13, 1954

2,683,404

UNITED STATES PATENT OFFICE 2,683,404

PLOW ATTACHMENT FOR TRACTORS

August G. Buhr, La Crosse, Wis., assignor to Allis-Chalmers Manufacturing Company, Milwaukee, Wis., a corporation of Delaware Application January 21, 1949, Serial No. 72,035

11 Claims. (Cl. 97—47.36)

This invention relates generally to tractor mounted implements and is more particularly concerned with the provision of a practical mounting structure designed to effectively position a plow forward of the rear axle structure and in plain view of the operator so as to afford excellent visibility in addition to those advantages previously considered as attainable only with rear attached or pull type plows.

Heretofore, considerable difficulty has even been experienced in obtaining a satisfactory hitching arrangement for a single plow attached to the rear of a tractor having a drive wheel tread spacing of fifty-six or more inches as the line of pull, which of necessity passes through the center of resistance of the plow bottom and through the tractor rear axle approximately centrally of the drive wheels, invariably results in an offset sufficient to cause steering trouble. And while bending of the plow beam to the left is of some help, it has been suggested that the most practical course to follow is to set the drive wheels to obtain a tread spacing as narrow as possible consistent with safety, and then add weight to the front wheels so as to prevent side slip.

In general, much the same difficulties have been experienced in previous attempts to mount moldboard plows forward of the rear axle structure and in plain view of the operator. And because of space and structural limitations these prior attempts have not proven entirely practical through failure to provide a mounting affording such features as: adequate trash clearance with a line of draft sufficiently low to prevent the plow from riding out of the ground as the tractor moves forward, a requisite degree of lateral offset of hitch point without adversely affecting the steering of the tractor or the stability of the plow under varying soil conditions, and/or ready attachment or detachment of the plow coupled with a lift range affording a ground clearance when the plow is raised to its transport position which is sufficient for all normal conditions of field travel.

As to steerability, it has been discovered that for a front attached plow horizontal stability is theoretically obtainable if the hitch point and position of the plow are such that the effective line of pull passes through the center of resistance of the plow (this center can be readily determined with practical certainty for any conventional plow) and intersects a vertical line through the rear axle structure approximately midway between the rear drive wheels. Practically it is preferable to have the line of pull pass slightly to the left of this vertical line (as viewed from the rear of the tractor) since this results in crowding the plow side front wheel against the wall of the furrow in which it is traveling thus improving steerability. In addition, consideration of a practical mounting structure necessitates a design such that the above mentioned effective line of pull intersects the front axle structure (when viewed in plan) at a point between the line of the wall of the furrow being plowed and the adjacent front wheel. However, in order to obtain vertical stability, that is, to prevent the plow from riding out of the ground as the tractor moves forward, the hitch point should in effect be located a considerable distance ahead of the plow to thereby provide a low line of draft. Thus it will be noted that while horizontal stability is improved as the position of the plow is moved forward relative to the rear axle structure, vertical stability is jeopardized since the latter improves as the position of the plow is moved rearward. And while these factors have apparently presented serious obstacles to the design of a practical front attached plow mounting, there are other factors requiring particular consideration.

For example, space limitation is also a controlling factor since the distance between the front and rear axles of known tractors is such that if the position of the plow therebetween is a compromise with respect to the previously discussed factors affecting horizontal and vertical stability, the effective line of pull will either not intersect the front axle structure, or if it does, the point of intersection will be closely adjacent the furrow traveling front wheel. Obviously, the hitch point and mounting structure must be positioned sufficiently inward from the adjacent front wheel to afford adequate steering movements thereof. However, moving the hitch point inward results in shifting the line of pull to the right of the aforementioned vertical line (as viewed from the rear of the tractor) which in turn adversely affects steerability since the furrow traveling front wheel tends to swing away from the furrow wall. In addition, an appreciable amount of landside pressure is generally considered essential and a controlling factor in obtaining horizontal stability under varying soil conditions and while such pressure can be readily increased by shifting the hitch point inward toward the central longitudinal axis of the tractor, it has been discovered than any advantage derived from thus increasing landside pressure is probably more than offset by the resulting shift of the effective line of pull to the right as previously explained.

It has also been discovered that a converging link mounting affords satisfactory vertical stability with a minimum longitudinal spacing between the hitch point and the center of plow resistance, and that horizontal stability can be efficiently and effectively obtained by locating the hitch point adjacent the front axle structure and between the longitudinal line of the wall of the furrow being plowed and the adjacent furrow traveling front wheel, and by employing a device positioned in oblique landside pressure increasing relation to the plow, this device functioning as a colter, a jointer, and/or as a device operative to compensate for insufficient landside pressure resulting from angled pull to the right of the direction of travel and to shift the effective center of resistance and line of pull to the left (as viewed from the rear of the tractor) so that the line of pull passes from the hitch point through the effective center of resistance and intersects a vertical line through the rear axle structure approximately midway between the drive wheels thereon. And while certain features of the discoveries and advantages hereinbefore mentioned are particularly applicable to the mounting of moldboard plows, certain aspects of these discoveries are of more general application and can be advantageously applied to other types of front attached plows.

Therefore, the present invention contemplates and has as a primary object the provision of a plow mounting incorporating an improved construction and combination of parts designed to position the plow forward of the rear axle structure and in plain view of the operator while affording one or more of the above stated functions and advantages.

Another object of this invention is to provide an improved mounting for a front attached plow including draft elements constructed and combined for coaction in a manner such that the forces transmitted therethrough are for the most part tension and compression forces thereby virtually eliminating the detrimental bending effect of laterally acting forces.

Still another object of the present invention is the provision of a front attached plow mounting wherein elements are constructed and combined for coaction in an improved manner effectively transferring all weight in excess of that required for obtaining good soil penetration to the front end of the tractor thereby rendering a front attached plow readily applicable to light weight tractors through eliminating or at least minimizing the use of front end weights to prevent front wheel side slip.

A further object of this invention is the provision of an improved mounting practical for attaching and operatively positioning a conventional moldboard plow forward of the tractor rear axle and in plain view of the operator, certain aspects of the mounting including a novel plow and disk combination wherein the disk stabilizes plowing operations through acting as a colter, a jointer, and as a device effective to shift the center of resistance and cause the line of pull or draft to pass through the shifted center of resistance and intersect a vertical line theoretically centrally between the rear drive wheels, but preferably slightly to the left of center as viewed from the rear of the tractor.

Still another object of this invention is to provide an improved mounting for tractor carried plows which can be readily attached to either side of the tractor in plain view of the operator and which includes parts combined for coaction in a novel manner effectively minimizing side sway when the plow is in either a fully or partially raised position.

An additional object of the present invention is to provide an improved tractor attached front mounting for either right or left hand plows which affords a simple, compact and durable construction that can be readily manufactured, assembled, operated and adjusted with a minimum of cost, time, effort and skill.

Apparatus suitable for accomplishing one or more of the above stated and other objects and advantages will become readily apparent from a consideration of the following disclosure of an illustrative embodiment of the invention. And while certain of the features hereinbefore mentioned have particular utility and advantage in connection with the front mounting of moldboard plows, other features have more general utility and can be advantageously applied to other types of front attached ground working tools. Accordingly, the present invention may be considered as comprising the various constructions and/or combinations hereinafter more fully set forth in the detailed description and appended claims, reference being had to the accompanying drawings of a preferred embodiment of the invention, in which:

Fig. 2 is a plan view of the combination shown in Fig. 1;

Figure 1:
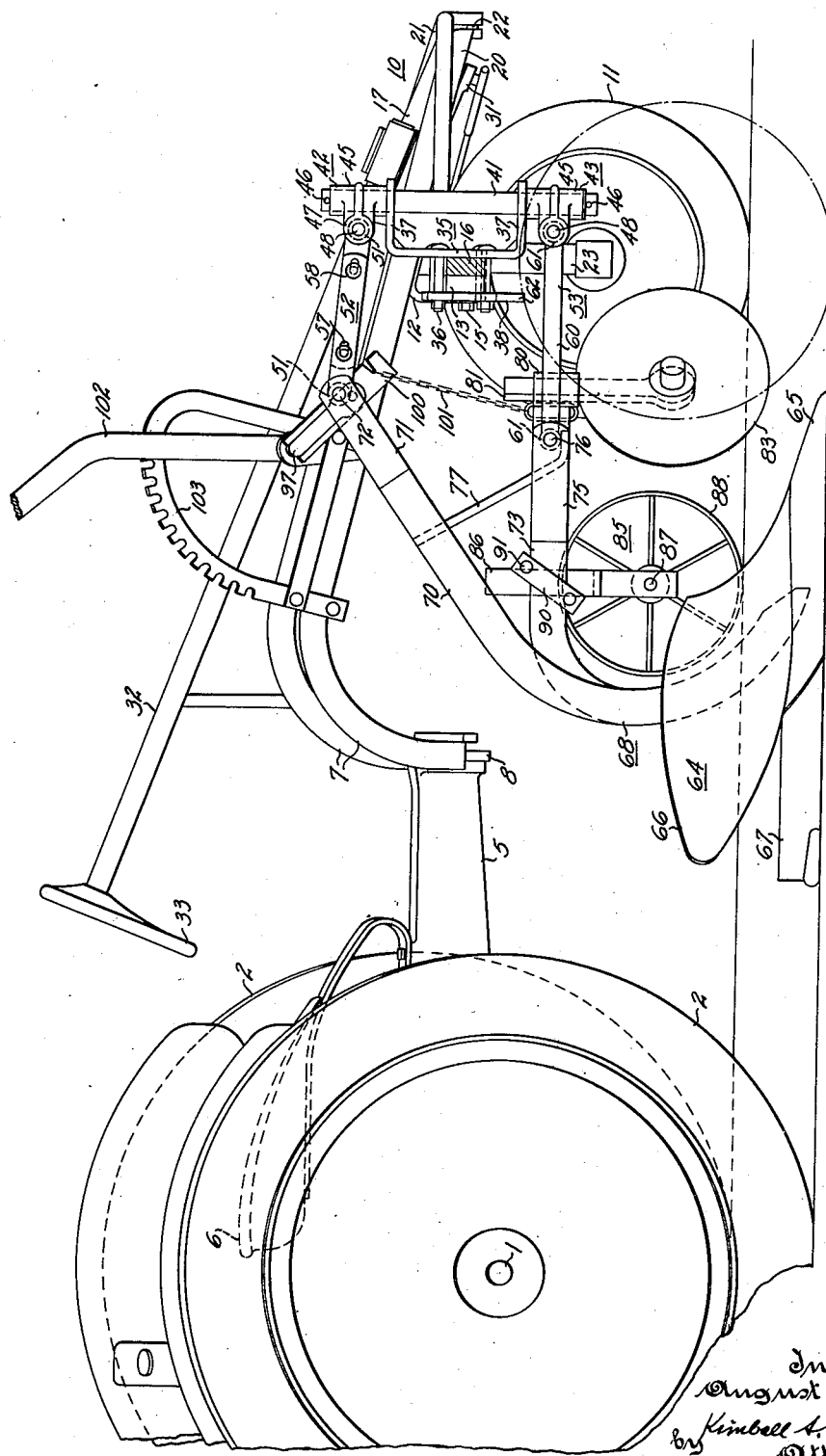
Fig. 1 is a right side view of a tractor-plow combination incorporating the invention with the near side front wheel removed to better show the mounting structure.

Referring particularly to Figs. 1 and 2 it will be seen that the tractor element of the combination comprises a rear axle structure 1 having a pair of laterally spaced ground engaging traction wheels 2 mounted at opposite ends thereof for lateral adjustment with respect to each other, a rearwardly projecting frame part 3 mounting a conventional type engine (not shown) in rearwardly overhanging relation with respect to axle structure 1, a forwardly extending tubular frame part 5 mounting an operator's seat or station 6 in elevated relation thereto and immediately in advance of frame part 3, a pair of laterally spaced upwardly arched tubular frame members 7 having their rear ends rigidly united with a transverse part 8 which in turn is fixedly secured to the forward end of central frame part 5, and a transverse front axle structure 10 secured to forward end portions of tubular frame members 7 and supported on a pair of laterally spaced dirigible front wheels 11. In this connection it should be noted that tubular frame members 7 are abruptly arched upward to a point of maximum height immediately in advance of frame part 5 and then extend gradually downward and forward to their points of connection with the front axle structure 10.

A conventional power transmitting means including the axle structure 1 is employed to convey power from the engine to traction wheels 2, and in this connection, it is to be understood that although not shown, the tractor is provided with suitable controls positioned within easy reach of an operator seated at station 6, as is the usual practice. Therefore, it is believed unnecessary to fully illustrate and describe these parts since they do not constitute a part of the present invention.

The front axle structure 10 comprises a rigid transverse brace member 12 extending between forward end portions of tubular frame members 7 with its opposite ends suitably secured in fixed bracing relation to said frame members, and a relatively long bar 13 pivotally connected at its midpoint to the center of brace member 12, as by a bolt 15, with opposite end portions thereof projecting laterally beyond frame members 7. The forward side of the opposed end portions of bar 13 are provided with relatively short similar side abutting bar members 16 detachably secured to bar 13 for selective adjustment longitudinally thereof so as to vary the tread spacing of the front wheels. The forward end portions of tubular frame members 7 are additionally braced by a rigid generally triangular shaped plate member 17 having its apex or forward end portion and also opposite side portions thereof turned down to form front and side walls 18 and 20, respectively, the rear end portions of walls 20 side abutting the forward end portions of tubular frame members 7 and being welded or otherwise fixedly secured thereto. Transverse bar 13 is also braced by a curved rod 21 having its midportion swivel connected with the apex portion of plate member 17, as indicated by numeral 22, and having bifurcated opposite end portions fixedly connected as by welding with the top edge of the outer portions of bar 13.

The outer end of each bar member 16 rigidly mounts a depending vertical bearing or sleeve 23 which in turn rotatably supports a wheel standard 25 for pivotal movement about a vertical axis, the lower portion of each standard 25 presenting a laterally extending spindle 26 rotatably mounting front wheel 11. The upper end of each standard is provided with a laterally extending arm 27 and each of these arms is connected, preferably by a link comprising telescoping sections 28 and 30, with a steering arm 31 mounted on the lower end of a shaft (not shown) extending vertically upward through rigid plate 17 and having its upper end gear connected with a steering wheel shaft or tube 32. A steering wheel 33 at the rear end of shaft 32 is positioned within easy reach of an operator sitting at station 6 and it should be noted that the forward end of this shaft is positioned approximately at the longitudinal center line of the tractor and extends rearward in oblique relation to such line (note the direction of shaft 32 in Fig. 2) to thereby afford the operator a practically unrestricted view of the ground between frame members 7.

A U-shaped bracket 35 is detachably secured to front axle bar 13 in laterally offset relation to the right of the longitudinal center line of the tractor by bolts 36 or the like with the spaced parallel upper and lower side portions 37 thereof disposed generally horizontal in forwardly extending relation to bar 13. To expedite the attaching and detaching of this bracket to bars 13 and 16 there is provided a pair of vertical strap members 38 each having openings therethrough (not shown) at the upper end portion for pivotally positioning the strap on the upper bolt and the lower portion has a notch 39 cut therein (see Fig. 3) to partially engage the lower bolt 36. These straps are in turn held in place on bolts 36 by nuts 40 and it will be obvious, therefore, that to move bracket 35 relative to the tractor front axle all that is necessary is to loosen nuts 40 on bolt 36, pivot strap members 38 about the top bolt and slide bracket 35 into or out of position relative to the axle as desired.

The forwardly extending portions of bracket 35 have aligned openings therethrough (not shown) into which a rod 41 is fixedly positioned as by welding with portions thereof extending above and below bracket 35. The extending portions of rod 41 serve as a vertical pivot means for connectors 42 and 43 which have a cylindrical sleeve portion 45 thereof rotatably mounted on either end of the rod and held thereon against vertical movement by pin 46, or other suitable means. The rearwardly facing portion of each cylindrical sleeve 45 has secured thereto a yoke 47, as by welding, which yoke has transversely aligned openings therethrough (not shown) receiving a pin 48 detachably secured against lateral movement relative to the yoke by cotter pins 50 or the like.

Pivotally mounted on transversely positioned pins 48 by suitable bearing means 51 and 61 are rearwardly extending link assemblies 52 and 53. Upper link assembly 52 comprises a pair of relatively flat links 55 and 56 positioned in side abutting relation with respect to each other and provided with slotted holes 57 receiving a pair of bolts 58 to adjustably secure the links together. The adjustment thereby afforded for the upper link permits a changing of the beaming angle of the plow attached thereto and described hereinafter. Opposite end portions of each flat link 55 and 56 have a transversely mounted bearing 51, secured thereto as by welding, the forward bearing receiving transverse pin 48 therethrough to afford vertical pivotal movement of upper link assembly 52 thereabout. And lower link 53 comprises a rod 60 having a transverse bearing part 61 similarly secured to either end. It will be obvious, therefore, that connectors 42 and 43 afford both vertical and horizontal swinging movement of upper and lower link assemblies 52 and 53 relative to vertical shaft 41. And in this connection it should be noted that the inner vertical strap member 38 includes a depending portion having a slanting edge 62 which is adapted for engagement with lower link 60, when the plow and link assembly are raised as for transport, in order to prevent excessive lateral movement of the plow structure during traveling movement.

A moldboard plow 64, comprising a share 65, moldboard 66, landside 67 and beam 68, is pivotally attached to the rear end portions of link assemblies 52 and 53. More specifically, plow beam 68 includes an upper part 70 which is rigidly secured at one end to moldboard 66 and then curves upwardly to a forked end part 71 having a detachable transverse pin 72 suitable for mounting in bearing means 51 at the rear of upper link 52, and a lower beam part 73 fixed to a lower portion of upper beam 70 extending forward therefrom in a generally horizontal plane and terminating in a forked end part 75 mounting a pin 76 carried by bearing means 61 at the rear of lower link 53. A brace member 77 rigidly unites an intermediate portion of upper plow beam 70 with the forward end portion of lower beam 73 in fixed vertically spaced relation with respect to each other. And it should now be obvious that plow beam 68 and plow 64 attached thereto are mounted on links 52 and 53 for vertical swinging movement as a unit about the transverse axes afforded by front bearing means 51 and 61.

The forward end portion 75 of lower beam 73 includes a section 74 thereof projecting inwardly at right angles to the length of the beam which section has fixed thereto in horizontal angular relation, as by welding, a bracket 80 having a rectangular shaped opening vertically therethrough. This opening (not shown) affords means for mounting a tool standard 81 received therein which is adjustably vertically fixed with respect thereto in any suitable manner such as by a set screw 82. Tool standard 81 rotatably supports a disk shaped tool 83 at the lower end thereof in forward adjacent relation to plow share 65.

And, intermediate the end portions of lower beam 73 there is adjustably fixed in laterally inwardly offset relation to landside 67 a gauge wheel 85 comprising a vertical wheel supporting part 86 terminating in a spindle 87 at its lower end rotatably mounting a wheel 88. Gauge wheel 85 is fixed to beam 73 for vertical and longitudinal adjustment with respect thereto in any suitable conventional manner such as by use of the pair of strap members 90 and bolts 91 connecting end portions thereof.

Figure 3:
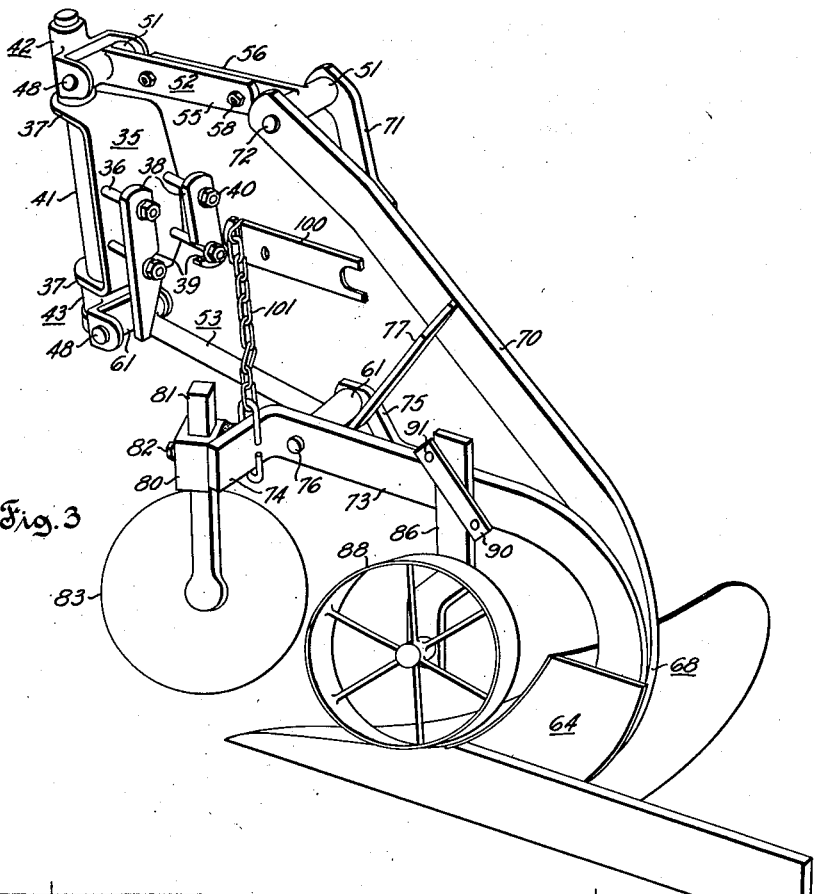
Fig. 3 is a perspective view of the plow mounting structure detached from the tractor.

Referring once more to upper and lower link assemblies 52 and 53, respectively, as shown in Figs. 1-3 it will be noted that the upper link 52 is generally parallel to the longitudinal center line of the tractor while the lower link is disposed in angular relation with respect to the tractor center line. More specifically, the lower link, which is subjected to tensional forces during operation of the plow, is positioned along the line of draft and therefore the lateral forces normally acting on plow beam 68 being pulled in laterally offset relation to the center line of the tractor are minimized. And the upper link 52, which is subject to compressive forces during plow operation and affords a beaming adjustment of the plow, necessarily lies in a plane parallel to landside 67 so that beaming the plow will not also cause lateral tilting or winging of plow bottom 64.

For raising and lowering the plow structure relative to the tractor frame there is provided a lift means comprising a transverse rock shaft 95 (Fig. 5) rotatably mounted in suitable bearing means 96 clamped on intermediate portions of tubular frame members 7, a lift arm 97 in the form of a crank lever having one portion inserted in the hollow end section of rock shaft 95 and secured therein against movement relative thereto by pin 98 or the like, a lift arm extension member 100 (Fig. 1) fixed in forwardly extending side abutting relation to the forwardly extending portion of lift arm 97, a connecting part extending from the free end portion of lift arm extension 100 downwardly to a forward portion of lower plow beam 73 (preferably a lost motion connecting part such as chain 101 pivotally fixed at its lower end to inwardly projecting beam portion 73), a lever 102 for rotating rock shaft 95, and a notched quadrant 103 mounted on the tractor frame in juxtaposition to lever 102 for selectively securing the lever in position.

Figures 5, 6:
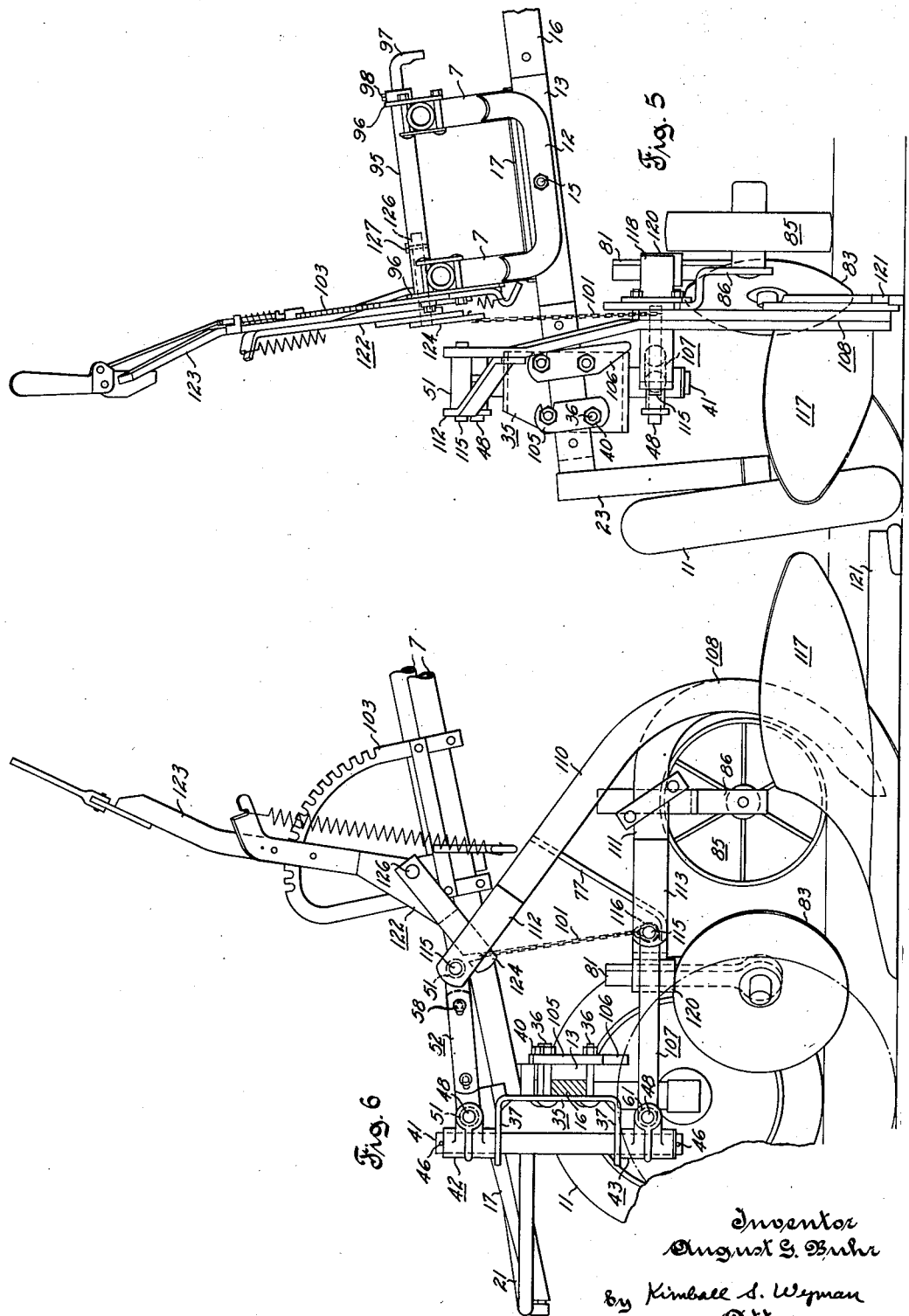
Fig. 5 is a rear view of the forward portion of the tractor mounting a left hand plow.
Fig. 6 is a side view of the structure shown in Fig. 5.

Referring now to Figs. 5 and 6 it may be seen that a left hand plow similar to that just described comprises a U-shaped bracket 35 detachably secured to front axle bar 13 in laterally offset relation to the left of the center line of the tractor by bolts 36 or the like with the spaced parallel upper and lower side portions 37 thereof disposed generally horizontal and extending forward from bar 13. The clamping means for detachably mounting this bracket on the front axle includes a pair of strap members 105 and 106 each having aligned openings therethrough (not shown) at the lower end portion for pivotally mounting the straps on the lower bolt 36 and the upper portion has a cut away portion for slidably engaging the upper bolt. Nuts 40 adjustably position strap members 105 and 106 along bolts 36.

The rearwardly extending linkage and the mounting therefor on vertical rod 41 are similar to those parts previously described for the right hand plow and, therefore, it is believed unnecessary to again describe such parts. It will be noted, however, that lower link 107 is not identical to lower link 53 on the right hand plow assembly since in both cases the lower link is located at an angle to the longitudinal center line of the tractor along the line of draft. Like numerals have been used to identify like parts of the right and left hand plows.

The plow beam and parts carried thereby are somewhat modified in this instance to adapt them for use on the left side of the tractor and, therefore, will be briefly described. As in the right hand plow the beam 108 comprises an upper beam 110 and a lower beam 111 presenting forwardly extending forked portions 112 and 113, respectively, laterally offset from the main beam portions in a direction away from the tractor center line, which forked portions carry transverse pins 115 rotatably mounted in bearing means 51 and 116 carried by the rear end portion of linkage 52 and 107, respectively. The lower curved end of beam 108 mounts a left hand moldboard plow 117 thereon in fixed relation thereto as by rivets or bolts (not shown). An intermediate portion of lower beam 111 has detachably fixed thereto for vertical and longitudinal adjustment therealong a gauge wheel 85. The forward end of lower beam 111 includes a portion 118 bent at right angles to the beam and extending inwardly toward the tractor center line which portion has fixed thereto in horizontal angular relation a vertically disposed shaft receiving tube 120 into which a tool standard 81 is slidably positioned in adjustably fixed relation thereto and mounting a disk shaped tool 83 at the lower end portion. Thus it is seen that the plow, disk and gauge wheel are arranged similarly to like parts of the right hand plow with the vertical axis of disk 83 and landside 121 disposed in longitudinal alignment and gauge wheel 85 offset inwardly from the landside 121 to travel in adjacent parallel relation thereto.

The lifting means for the left hand plow structure is preferably somewhat modified with respect to that previously described for the right hand plow. In this instance the lever 122 comprises a crank having an upwardly extending lever arm 123 with a forwardly extending lift arm 124 fixed to a lower portion thereof as by welding, and the entire lever is fixedly mounted at the junction of the two arms on a straight shaft 126 fixedly positioned in a hollow end portion of rock shaft 95, as by a pin 127, for movement therewith. Other parts of the lift mechanism are similar to those described in connection with the right hand plow and a description thereof is believed unnecessary.

Figure 4:
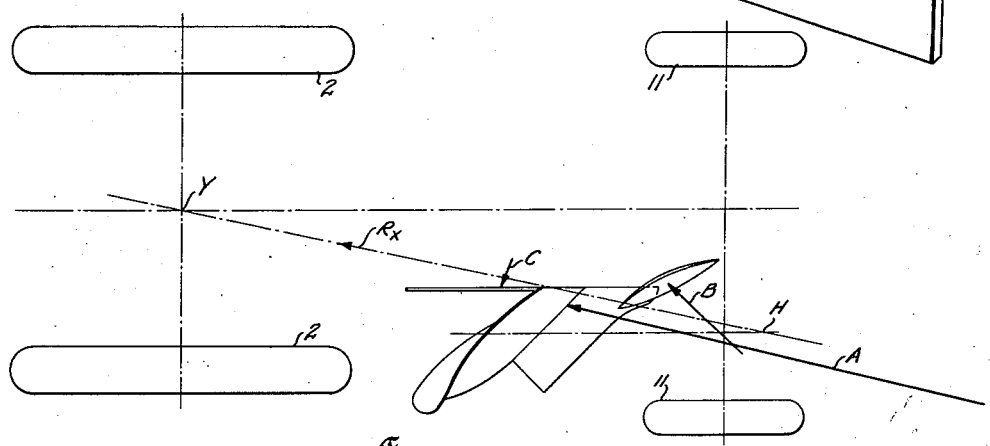
Fig. 4 is a schematic view illustrating the relative wheel spacings, the position of the plow and colter, and the relative values and directions of the various forces affecting steerability.

Referring generally to Figs. 1, 2 and 4 an explanation will be made as to the operation of the right hand plow and the effect thereon of the particular construction and arrangement of parts chosen to illustrate the present invention.

For most efficient operation it has been found desirable to have the plow attached to or drawn behind the tractor in a manner such that the line of pull intersects a vertical plane through the transverse axis of the driving wheels at a point approximately midway between the wheels. Under this condition each of the wheels exerts nearly the same amount of tractive effort and as a result there is no side slip of the vehicle. And, it is desirable that the line of draft for the plow be as low as possible in order to prevent the plow riding out of the ground. In addition, the mounting of a plow on a forward portion of the tractor, as in the present invention, offers the additional problem of positioning the plow so as not to interfere with the steering of the tractor.

The construction and arrangement of parts in the illustrated embodiment of this invention solves the above mentioned problems in a completely satisfactory manner.

In order to effect an equalization of the tractive effort expended by the rear driving wheels it has been found that by placing the hitch point a little forward of the front axle structure, by laterally offsetting the adjacent front wheel to ride in the previously cut furrow, and by placing the plow in inwardly offset relation to the hitch point the line of pull passes substantially through a line normal to the transverse axis of the rear axle structure at a point midway therebetween.

And to achieve the effect of a low angle of draft it was conceived that by placing the links in forwardly converging relation to each other the result would be the same as though the plow was being pulled from the point where the line extensions of the links intersect, which point is considerably forward of the tractor on a level with the pivot point for the lower beam.

However, in practice it was found that this arrangement did not afford sufficient pressure on the landside of the plow to prevent the plow from swinging out of the furrow being cut. Therefore, to increase the lateral force acting on the plow there was added a rotatable disk positioned at an angle to the direction of travel which not only stabilizes the plow by adding to the lateral thrust on the plow structure but also serves as a colter and jointer.

More specifically, in Fig. 4, A is the resultant of the forces on the moldboard and share, B is the resultant of the forces on the disk, and C is the resultant force of the resistance of the soil to the landside. H is the point of hitch for the plow and Y is the midpoint of the rear axle. And with the structure described herein, positioned on the tractor as previously stated, it has been found that $R_x$, the resultant of forces A, B and C, passes through a vertical line substantially midway between the wheels and normal to the transverse axis of the wheels. Consequently, equal effort is required of the rear driving wheels to pull the front mounted plow and there is little tendency to divert the tractor from a straight line of travel.

In general terms, the herein disclosed motor plow comprises a tractor having a dirigible wheel support 11, 12, 13 at its forward end and a rear axle structure mounting a rear driving wheel at one side of said tractor in tracking relation to a furrow being plowed, and another rear driving wheel at the other side of said tractor for travel on unplowed land. The hitch bracket 35 is carried by the tractor forwardly of the furrow tracking rear wheel 2 at the right side of the tractor, and the rearwardly extending plow beam 68 is carried by said bracket through connecting means 42, 43, 52, 53 affording lateral swinging movement of said beam on the vertical axis of rod 41 which is spaced laterally outward from the longitudinal axis of the tractor, and which connecting means also afford up and down movement of the beam 68 relative to the hitch bracket 35. The unilateral soil turning moldboard plow 64 is disposed for directing soil laterally outward relative to the axis of rod 41, and the share 65 of the plow has its forwardly extending point offset laterally inward with respect to said vertical axis. The beam 65 has forwardly extending vertically and laterally diverging portions 70 and 73 terminating in vertically and laterally spaced parts which have pivotally supported connection with rear end portions of the upper and lower links 52 and 53, respectively, to thereby position said links with the upper link disposed along a line parallel to the direction of travel of the tractor and with said lower link disposed along a line extending laterally inward in a rearward direction from the axis of the vertical rod 41. In the illustrated embodiment of the invention, an extension of the line of disposition of the lower link intersets a vertical line passing through the tractor rear axle structure approximately midway between the rear driving wheels, as illustrated by Fig. 4.

The apparatus hereinbefore described is merely illustrative of a practical embodiment of the invention, and it should therefore be understood that it is not intended to limit the invention to the exact details of the illustrated embodiments as various modifications within the scope of the appended claims may occur to persons skilled in the art.

It is claimed and desired to secure by Letters Patent:

1. In a tractor having wide front and rear axle structures supported at opposite ends on dirigible front wheels and on rear driving wheels, respectively, and wherein the front and rear wheels on one side of the tractor are laterally offset relative to each other to travel, respectively, in the furrow last plowed and in the furrow then being plowed, the combination comprising: a support carried by said tractor and positioned adjacent said front axle structure intermediate the longitudinal axis of the tractor and the furrow side one of said dirigible wheels; a rearwardly extending beam carried by said support through pivot means affording both horizontal and vertical swinging movement of said beam relative to said support; a unilateral soil turning moldboard plow fixedly attached to a rear portion of said tool beam and being positioned thereby in advance of the furrow side one of said rear wheels with its moldboard disposed for directing soil laterally outward relative to said axis; and a colter positioned in advance of said moldboard plow in an oblique landside pressure increasing relation to said plow.

2. In a tractor having wide front and rear axle structures supported at opposite ends on dirigible front wheels and on rear driving wheels, respectively, and wherein the front and rear wheels on one side of the tractor are laterally offset relative to each other to travel respectively in the furrow last plowed and in a furrow then being plowed, the combination comprising, a support carried by said tractor and including a bracket positioned adjacent said front axle structure intermediate the longitudinal axis of the tractor and the furrow side one of said dirigible wheels; a part mounted on said bracket for pivotal movement relative thereto about a generally vertical axis; a rear wardly extending beam carried by said part for vertical movement relative thereto about a transverse axis; and a unilateral soil turning moldboard plow fixedly attached to a rear portion of said beam and being positioned thereby in advance of the furrow side one of said rear wheels with its moldboard disposed for directing soil laterally outward relative to said longitudinal axis, said plow including a share having its forwardly extending point laterally offset from said part in the direction of said transverse axis.

3. In a tractor having wide front and rear axle structures supported at opposite ends on dirigible front wheels and on rear driving wheels, respectively, and wherein the front and rear wheels on one side of the tractor are laterally offset relative to each other to travel respectively in the furrow last plowed and in the furrow then being plowed, the combination comprising: a support carried by said tractor and including a bracket positioned adjacent said front axle structure intermediate the longitudinal axis of the tractor and the furrow side one of said dirigible wheels; a pair of rearwardly extending links supported on vertically spaced portions of said bracket for vertical swinging movement about generally parallel transverse axes and for lateral swinging movement about a generally vertical axis; and a rigid tool beam presenting forwardly extending vertically and laterally diverging portions terminating in vertically and laterally spaced parts having pivotal supported connection with rear end portions of said links.

4. In a tractor having wide front and rear axle structures supported at opposite ends on dirigible front wheels and on rear driving wheels, respectively, and wherein the front and rear wheels on one side of the tractor are laterally offset relative to each other to travel respectively in the furrow last plowed and in the furrow then being plowed, the combination comprising: a support carried by said tractor and including a bracket carried by said tractor in a position adjacent said front axle structure with said bracket disposed intermediate the longitudinal axis of said tractor and the furrow side one of said dirigible wheels; a part mounted on said bracket for pivotal movement relative thereto about a generally vertical axis; a pair of rearwardly extending links supported on vertically spaced portions of said part for vertical swinging movement about generally parallel transverse axes; a rigid tool beam including forwardly extending vertically and laterally diverging portions having pivotal supported connection with rear end portions of said links, said diverging beam portions being operative to position said links with the upper link disposed along a line parallel to the direction of travel of the tractor and the lower link along a line in oblique relation to the direction of travel such that an extension thereof intersects a vertical line passing through the rear axle structure approximately midway between the rear driving wheels.

5. In a tractor having wide front and rear axle structures supported at opposite ends on dirigible front wheels and on rear driving wheels, respectively, and wherein the front and rear wheels on one side of the tractor are laterally offset relative to each other to travel respectively in the furrow last plowed and in the furrow then being plowed, the combination comprising: a support carried by said tractor and including a bracket positioned adjacent said front axle structure with said bracket disposed intermediate the longitudinal axis of said tractor and the furrow side one of said dirigible wheels; a part mounted on said bracket for pivot movement relative thereto about a generally vertical axis, a pair of rearwardly extending links supported on vertically spaced portions of said part for vertical swinging movement about generally parallel transverse axes; a rigid tool beam including forwardly extending vertically and laterally diverging portions terminating in vertically and laterally spaced parts having pivotal supported connection with rear end portions of said links; and a unilateral soil turning moldboard plow fixedly attached to a rear portion of said beam with its landside generally parallel to the longitudinal axis of said tractor.

6. In a tractor having wide front and rear axle structures supported at opposite ends on dirigible front wheels and on rear driving wheels, respectively, and wherein the front and rear wheels on one side of the tractor are laterally offset relative to each other to travel respectively in the furrow last plowed and in the furrow then being plowed, the combination comprising: a support carried by said tractor and positioned adjacent said front axle structure intermediate the central longitudinal axis of said tractor and the furrow side one of said dirigible wheels, said support including a part mounted for pivotal movement about a generally vertical axis; a pair of rearwardly extending links supported on vertically spaced portions of said part for vertical swinging movement about generally parallel transverse axes; a rigid tool beam including forwardly extending vertically and laterally diverging portions terminating in laterally and vertically spaced parts having pivotal supported connection with rear end portions of said links; a unilateral soil turning moldboard plow fixedly attached to a rear portion of said beam and being positioned thereby in advance of the furrow side one of said rear wheels with its landside generally parallel to the longitudinal axis of said tractor; and a rolling colter carried by said beam and positioned in oblique landside pressure increasing relation to said plow.

7. In a tractor having wide front and rear axle structures supported at opposite ends on dirigible front wheels and on rear driving wheels, respectively, and wherein the front and rear wheels on one side of the tractor are laterally offset relative to each other to travel respectively in the furrow last plowed and in the furrow then being plowed, the combination comprising: a support carried by said tractor adjacent said front axle structure and disposed between the central longitudinal axis of said tractor and one of said dirigible wheels, said support including a part disposed for pivotal movement relative thereto about a generally vertical axis; a pair of rearwardly extending links supported on vertically spaced portions of said part for vertical swinging movement about generally parallel transverse axes; a rigid tool beam including vertically and laterally diverging forward portions terminating in vertically and laterally spaced parts having pivotal supported connection with rear end portions of said links, said diverging beam portions having their connections with said links spaced apart vertically a distance greater than the vertical spacing of said transverse axes; and a unilateral soil turning plow structure fixedly attached to a rear portion of said beam and being positioned thereby in advance of the furrow side one of said rear wheels, said plow including a share having its forwardly disposed point laterally offset from said part in the direction of said transverse axes.

8. In a tractor having wide front and rear axle structures supported at opposite ends on dirigible front wheels and on rear driving wheels, respectively, and wherein the front and rear wheels on one side of the tractor are laterally offset relative to each other to travel respectively in the furrow last plowed and in the furrow then being plowed, the combination comprising: a support carried by said tractor and positioned adjacent said front axle structure intermediate the longitudinal axis of the tractor and the furrow side one of said dirigible wheels; a pair of rearwardly extending links supported on vertically spaced portions of said support for vertical swinging movement about generally parallel transverse axes; a rigid tool beam including forwardly extending vertically diverging portions having pivotal supported connection with rear end portions of said links, said diverging beam portions having their connections with said links spaced apart vertically a distance greater than the vertical spacing of said transverse axes; a unilateral soil turning moldboard plow fixedly attached to a rear portion of said beam and being positioned thereby in advance of the furrow side one of said rear wheels; and a colter carried by said beam and positioned in oblique landside pressure increasing relation to said plow.

9. In a tractor having wide front and rear axle structures supported at opposite ends on dirigible front wheels and on rear driving wheels, respectively, and wherein the front and rear wheels on one side of the tractor are laterally offset relative to each other to travel respectively in the furrow last plowed and in the furrow then being plowed, the combination comprising: a support carried by said tractor and positioned adjacent said front axle structure intermediate the longitudinal axis of the tractor and one of said dirigible wheels; a rearwardly extending tool beam carried by said support for horizontal and vertical swinging movement relative thereto; a unilateral soil turning moldboard plow fixedly attached to a rear portion of said tool beam and being positioned thereby in advance of the furrow side one of said rear wheels, said plow including a share having its forwardly extending point positioned intermediate said longitudinal axis and said support; and a colter carried by said tool beam in landside pressure increasing relation to said plow.

10. In a tractor having wide front and rear axle structures supported at opposite ends on dirigible front wheels and on rear driving wheels, respectively, and wherein the front and rear wheels on one side of the tractor are laterally offset relative to each other to travel respectively in the furrow last plowed and in the furrow then being plowed, the combination comprising: a support carried by said tractor and positioned adjacent said front axle structure intermediate the longitudinal axis of the tractor and one of said dirigible wheels; a pair of rearwardly extending links pivotally mounted on vertically spaced portions of said support for vertical swinging movement about generally parallel transverse axes; a rigid tool beam including forwardly extending vertically and laterally diverging portions terminating in vertically and laterally spaced parts having pivotal supported connection with rear end portions of said links to thereby position said links with the upper link disposed along a line parallel to the direction of travel of the tractor and the lower link along a line such that an extension thereof intersects a vertical line passing through the rear axle approximately midway between the rear driving wheels; a unilateral soil turning moldboard plow fixedly attached to a rear portion of said tool beam and being positioned thereby in advance of the furrow side one of said rear wheels with its landside disposed in generally parallel relation to the direction of travel; and a colter carried by said tool beam in landside pressure increasing relation to said plow.

11. A motor plow comprising, in combination, a tractor having a dirigible wheel support at its forward end and a rear axle structure mounting a rear driving wheel at one side of said tractor in tracking relation to a furrow being plowed and another rear driving wheel at the other side of said tractor for travel on unplowed land; a hitch bracket carried by said tractor forwardly of said furrow tracking rear wheel at said one side of said tractor; a rearwardly extending beam carried by said bracket through connecting means affording lateral swinging movement of said beam on a vertical axis spaced laterally outward from the longitudinal axis of said tractor, and also affording up and down movement of said beam relative to said bracket; and a unilateral soil turning moldboard plow fixedly attached to a rear portion of said beam and being positioned thereby in advance of said furrow tracking rear wheel with its moldboard disposed for directing soil laterally outward relative to said vertical axis, said plow including a share having its forwardly extending point offset laterally inward with respect to said vertical axis.

References Cited in the file of this patent

UNITED STATES PATENTS

| Number | Name | Date |
| --- | --- | --- |
| 205,498 | Palmer | July 2, 1878 |
| 780,218 | McCloskey | Jan. 17, 1905 |
| 1,501,652 | Ferguson | July 15, 1924 |
| 1,569,705 | Buescher et al. | Jan. 12, 1926 |
| 1,733,914 | Shiller | Oct. 29, 1929 |
| 1,793,900 | Berends | Feb. 24, 1931 |
| 1,901,684 | White et al. | Mar. 14, 1933 |
| 2,041,832 | Hester | May 26, 1936 |
| 2,109,055 | Spande | Feb. 22, 1938 |
| 2,172,971 | Graham | Sept. 12, 1939 |
| 2,244,774 | Hewitt | June 10, 1941 |
| 2,274,438 | Stoner | Feb. 24, 1942 |
| 2,364,878 | Storz | Dec. 12, 1944 |
| 2,403,360 | Graham | July 2, 1946 |
| 2,501,557 | Wikkerink | Mar. 21, 1950 |